N. W. Pomeroy,
Oil Can,
№ 16,553. Patented Feb. 3, 1857.
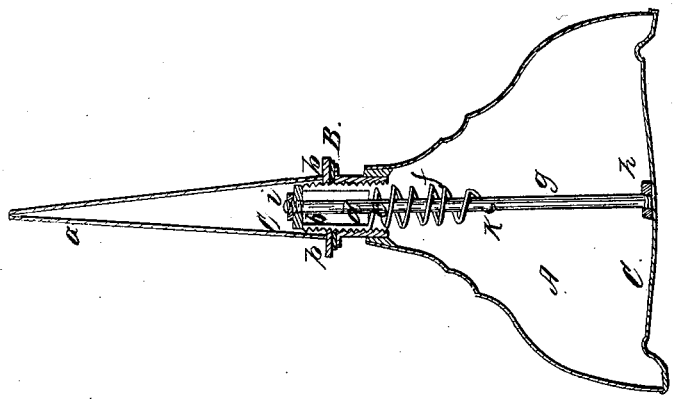
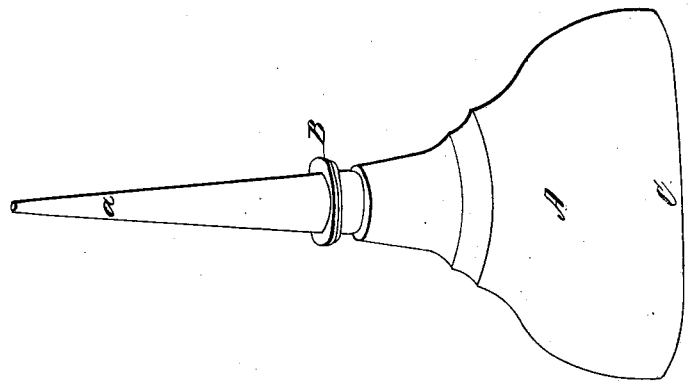

UNITED STATES PATENT OFFICE.

NORMAN W. POMEROY, OF MERIDEN, CONNECTICUT.

IMPROVED LUBRICATOR.

Specification forming part of Letters Patent No. 16,553, dated February 3, 1857.

*To all whom it may concern:*

Be it known that I, NORMAN W. POMEROY, of the the town of Meriden, in the county of New Haven and State of Connecticut, have invented a new and useful Improvement in Oilers for Machinery, &c., (it being an improvement on my oiler patented September 23, 1856;) and I do hereby declare that the following is a full, clear, and exact description of the construction, character, and operation of the same, reference being had to the accompanying drawings, which make a part of this specification, in which—

Figure 1 is a perspective view of the oiler complete. Fig. 2 is a plan of the same cut vertically through the center, showing the valve, spiral-spring connection, &c.

My improvement consists in adding to my "oiler" patented September 23, 1856, a valve located in the delivery-tube resting on a proper seat, to be closed by a spiral spring, while the valve-rod passes down, so that its lower end will rest on the inside of the elastic disk which serves as the bottom of the oil-vessel, so that by pressing the elastic disk inward against the end of the valve-rod it will open the valve and allow the oil to escape, and the spring will close the valve when the pressure is removed.

I make the main part A of the vessel of tinned iron or any other suitable material, in the form shown in Fig. 1, or any other convenient shape, making the bottom or elastic disk C of well-rolled or planished sheet-brass (or other sheet metal) raised to the waving shape shown in section in Fig. 2, and as fully explained and set forth in my patent therefor issued September 23, 1856.

I make the delivery-tube $a$ of any suitable metal, substantially of the shape shown in Figs. 1 and 2, and of sufficient thickness at the larger end to sustain a thread or female screw, as shown in Fig. 2. I attach this tube $a$ to the main part A by a double screw-connection, (with suitable packing,) as represented in section at B, Fig. 2. The upper end, $b$, of this screw-connection serves as a valve-seat for the valve $c$, while the lower end, $d$, serves as a shoulder or circular projection for the upper end, $e$, of the spiral spring $f$ to rest against, as shown in Fig. 2.

I make the valve-rod $g$ of iron wire or any other suitable material, of a length suited to carry the valve $c$, and also to extend to the elastic disk or bottom C; and to make the distance exact I attach a button or ball, $h$, to the lower end of the rod $g$ by a graduating-screw, to enable me to adjust it; and to the upper end of this valve-rod $g$, I attach the valve $c$, (which I make of leather or any other suitable material,) and secure it with a nut, $i$, (or by any other appropriate means,) and around this valve-rod $g$, I place the spiral spring $f$, attaching its lower end to the rod $g$, as shown at $k$, or in any other appropriate way, so that the spring will have sufficient force (when its upper end, $e$, rests against the lower end of the screw-connection) to close the valve $c$ air-tight and prevent any escape of oil in whatever position the vessel may happen to be dropped or intentionally placed.

Having made all the parts as before described, and secured the lower end of the valve-spring $f$ to the valve-rod $g$, I pass the upper end of the rod $g$ upward through the double screw-connection, slip on the valve $c$ and secure it by the nut $i$, adjust the button $h$ to the proper point, screw on the tube $a$, fill the vessel with oil, and insert the valve-rod and spring into the main part of the vessel and turn in the screw-connection, when the oiler will be ready for use, when, by pressing the elastic bottom C inward, (with the thumb or finger,) the elastic bottom C, being in contact with, will press the button $h$ and, by means of the rod $g$, open the valve $c$ and force out the oil, and when the pressure is removed the elastic bottom C will return to its original position, and the spring $f$ will close the valve, as shown in Fig. 2.

The advantages of my improvement consists in part in its being much less expensive in its manufacture than any other oiler, with a valve less liable to get out of order, and if the spring should break or the valve should fail it will still work the same as my former patent of September 23, 1856; and in that it has the spring and all other matters in relation to working the valve (except my patent elastic disk C) inside, so as to render it more compact than any kind heretofore known, while all the parts are readily accessible (merely by unscrewing the connection or coupler in either part,) so that any injured or defective part may be readily removed and its place supplied by a perfect part without any detriment to the other parts; and in that it is peculiarly adapted to inject oil into horizontal boxes, &c.; and in that it may be rolled about the floor or bench without the least risk of the oil escaping, it being a safe repository in every position.

What I claim as my invention, and desire to secure by Letters Patent, is—

The method of working the valve $c$ by means of the spiral spring $f$ and elastic disk or bottom C, when the whole is constructed, arranged, and made to operate substantially as herein described.

NORMAN W. POMEROY.

Witnesses:
 NOBLE TOUNER,
 R. FITZGERALD.